Feb. 15, 1966 K. H. TOWNSEND 3,235,198

RECORDING-TAPE REEL WITH TAPE ANCHOR MEANS

Filed Feb. 25, 1963

INVENTOR.
Kenneth H. Townsend

BY

Bair, Freeman & Molinare
Attys.

United States Patent Office 3,235,198
Patented Feb. 15, 1966

3,235,198
RECORDING-TAPE REEL WITH TAPE ANCHOR MEANS

Kenneth H. Townsend, Gambrills, Md., assignor, by mesne assignments, to Amerline Corporation, Chicago, Ill., a corporation of Illinois

Filed Feb. 25, 1963, Ser. No. 260,775
2 Claims. (Cl. 242—74.2)

This invention relates to an improved tape-holding reel, and it particularly relates to a tape reel which is provided with means for conveniently receiving and positively securing a leading portion of tape on the reel.

In designing reels for holding computer tape, recording machine tapes, film, etc., it is desirable that means be provided for securing or anchoring a leading portion of the tape on the reel so as to provide a "start" for the collection of tape on the reel. However, methods or devices which have been used in the past for "starting" the tape on a reel have not proven to be satisfactory. First, it is usually a problem to initially secure the tape to the hub of a reel. Secondly, even after the tape is though to be secure, it often becomes disengaged from the hub and once again must be secured.

A common means heretofore used for "starting" tape on the hub of a tape reel is the provision of a slot in the hub of the reel. The tape is first inserted into the slot, but must then be wound around the hub two or three times in order to more positively secure the tape to the reel. However, it is generally quite annoying to "fish" for the slot with the end of the tape in order to insert the tape. Further, once the tape is in the slot, it often slips out before the tape can be wound around the hub of the reel. Furthermore, the problem of inserting the end of the tape in the slot becomes more pronounced as the distance between the outer diameter of the reel and the outer diameter of the hub increases and also as the flexibility of the tape increases, since control over directing the end of the tape is correspondingly reduced.

Therefore, a primary object of this invention is to provide an improved tape-holding reel having means for conveniently receiving and anchoring a leading portion of tape on the hub of a reel.

It is another object of this invention to provide an improved tape reel for recording tape, said reel comprising a hub having a tape-receiving surface, a concave depressed portion in said tape-receiving portion extending only part way across the transverse width of the tape-receiving surface, and biased maintaining means on the reel for maintaining the tape against the hub, the maintaining means including a clamping portion complementary to the depression and aligned with and movable into registry with the depression, the clamping portion having an upper surface which is substantially flush with the tape-receiving surface of the hub when the clamping portion is in registry with the depression.

Further purposes and objects of the present invention will appear as the specification proceeds.

One embodiment of the present invention is illustrated in the accompanying drawings, wherein.

Figure 1:
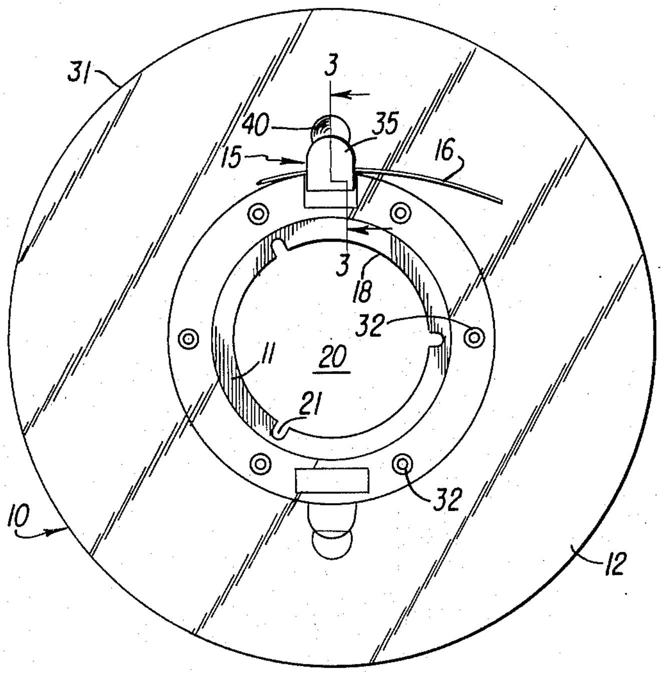
FIG. 1 is a top plan view of a tape-holding reel having means for conveniently receiving and securing a leading portion of the tape on the reel.

Referring to the drawings, the tape-holding reel 10, which accomplishes the objects previously set forth, includes a hub 11, means, generally 15, rotatably mounted with respect to the hub 11, for holding the tape 16 on the hub 11, and means 17 for urging the holding means 15 against the hub 11, whereby a leading portion **16*a* of the tape 16 is maintained securely in position on the hub 11**.

The hub 11 is generally cylindrical in shape and has an opening 20 at its center portion. Slots 21 are provided on the inner wall 18 of the hub 11 and are adapted to engage slot-receiving members positioned on the shaft (not shown) of a computing machine, recording machine, etc.

The hub 11 includes a first side 23 and a second side 24, each of which is recessed, as at 25 and 26, so as to receive side members 12 and 13. The first side 23 and second side 24 are positioned at approximately right angles to a tape-receiving surface 28. The tape-recording surface 28 is provided with at least one recessed portion 29, which is adapted to receive a leading portion **16*a* of tape 16. As shown most clearly in FIG. 3, at least one opening 30 is provided in the hub 11 for receiving tape-holding means 15 and is aligned with the depression 29 in the tape-receiving surface 28**.

Figure 5:
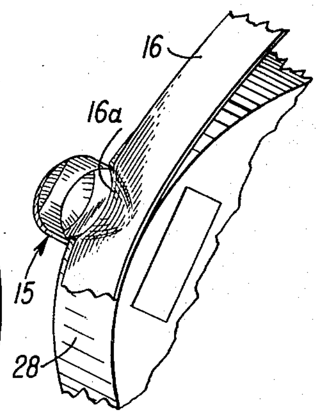
FIG. 5 is a perspective view of the means for receiving and securing the tape to the hub of the reel.
Figure 2:
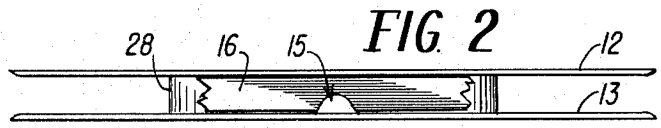
FIG. 2 is a side elevational view of the embodiment of FIG. 1.
Figure 3:
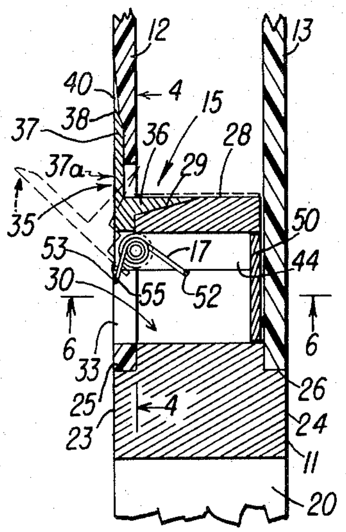
FIG. 3 is a partially broken, enlarged, sectional view taken along the line 3—3 of FIG. 1.

The side members 12 and 13 of the reel 10 are disc-like and the outer diameter or extremity 31 projects beyond the tape-receiving surface 28 in order to provide a lateral guide for the tape 16 while it is being progressively wound around the hub 11. The side members 12 and 13 are placed in the recesses 25 and 26 and then are fastened to the hub 11 by any suitable means, such as screws, as at 32. The side members 12 and 13 also have at least one opening 33, which is aligned with the opening 30 in the hub 11 and the depression 29 in the tape-receiving surface 28. The depression 29 as seen in FIGS. 2, 3 and 5, extends from adjacent one flange only part way across the transverse width of the tape-receiving surface 28. In FIG. 3 it is seen that the depression extends about half way across the width of the tape-receiving surface 28. Preferably, at least one of the side members 12 or 13 is made of a transparent material so, as the tape 16 is being secured to the hub 11, the operation may be observed.

The means 15 for securing the tape 16 against the tape-receiving surface 28 includes a rotatable member, generally 35, which is rotatably mounted about an axis normal to the axis of the hub 11. The rotatable member 35 includes a clamping portion 36, preferably convex, which is complementary in shape to and engages the concave or depressed portion 29 of the tape-receiving surface 28, so as to position and trap a portion **16*a* of tape 16 between the portion 36 and the depression 29. It is preferred that the upper surface of the clamping portion 36 be in substantial alignment with the tape-receiving surface 28 so that, as tape is being wound around the hub 11, the tape does not become raised above the portion 36**.

The rotatable member 35 also includes a lifting member or portion 37 which is positioned at approximately right angles to the clamping portion 36 and is tapered at its upper end, as at 38. The lift member 37 and tapered portion 38 are aligned with a depressed portion 40 on side 12 or 13 so that a fingernail may be inserted beneath the tapered portion 38 for rotating member 35 away from the tape-receiving surface 28 so as to release or receive tape 16. Furthermore, it is desirable that the outer surface **37*a* does not project beyond, and is preferably substantially flush with the sides 12 or 13**, since tape reels are often in close contact with the side of a computer machine or recording machine, and thus projections cannot be tolerated.

Figure 6:
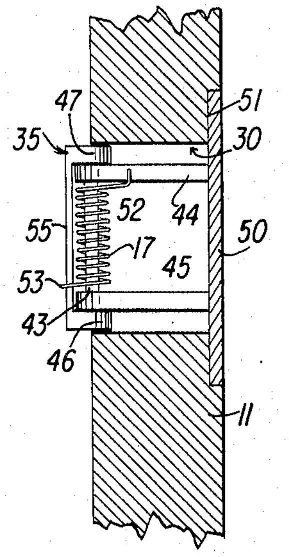
FIG. 6 is a partially broken, sectional view taken along line 6—6 of FIG. 3.
Figure 4:
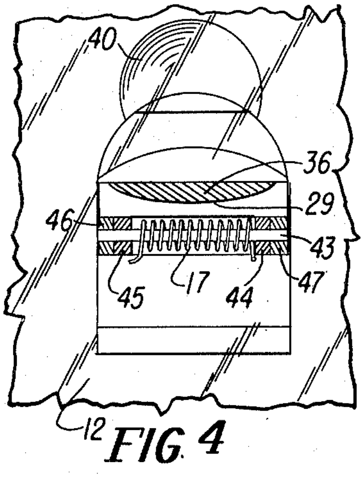
FIG. 4 is a partially broken, sectional view taken along line 4—4 of FIG. 3.

Referring particularly to FIGS. 4 and 6, the rotatable member 35 has projections 46 and 47 rotatably mounted on the ends of shaft 43, as shown in FIG. 6. Shaft 43 is secured to the bar supports 44 and 45 which are integral with the end plate 50 and spaced inwardly from the ends of the shaft. The holding means 15, including the rotatable member 35 and bars 44 and 45, are passed through the opening 30 of the hub 11 and the end plate 50 is positioned within a recess 51 of the hub 11. One of the side members, as 13, is then positioned on the hub 11 and maintains the plate 50 within recess 51.

The means 17 for urging the clamping portion 36 toward the tap-receiving surface 28 of the hub 11 is advantageously a coiled spring which is positioned around the shaft 43. The first end 52 of the urging means or spring member 17 is positioned against a suitable surface, as bar support 44, and the second end 53 of the member 17 is positioned against a lip or projection 55 of the rotatable member 35 whereby the clamping portion 36 is rotatably forced toward the tape-receiving surface 28.

Although the method for inserting and securing the tape on the hub 11 of the reel 10 should be clear from the foregoing discussion, the method of operation may be more clearly understood by referring to FIGS. 1, 3 and 5. When it is desired that a tape 16 be secured on the reel 10, the operator may insert a fingernail beneath the tapered portion 38 of the lift member 37 and then rotate the clamping portion 36 away from the tape-receiving surface 28 of the hub 11, as shown in dotted lines in FIG. 3. The tape 16 is then set loosely across the tape-receiving surface 28 while making sure that a portion 16*a* of the tape 16 is positioned above the depression 29. When the tape is so positioned, the rotatable member 35 is released and the member 17 urges the clamping portion 36 towards the tape-receiving surface 28 in order to trap the tape portion 16*a* between the convex clamping portion 36 and the concave depressed member 29 of the tape-receiving surface 28, thereby positively securing the tape 16 in position on the reel 10.

From the above discussion, it is seen that all the objects previously set forth are accomplished by the described device. A tape 16 may be conveniently received and secured to the hub 11 of the reel 10 while at the same time a positive force is applied against the tape so that it stays in position without the necessity of winding the tape around the hub. Furthermore, these advantages are realized despite the relative flexibility of the tape being used or the relative diameter of the reel. Still further, the tape reel does not have any undesirable projections while in use. Also, the tape does not have any raised portions while being collected on the reel since the upper surface of the clamping portion 36 is substantially flush with the tape-receiving surface 28.

While in the foregoing there has been a detailed description of the structure of the present inventive device, it is to be understood that all equivalents obvious to those skilled in the art are to be included within the scope of the invention, as claimed.

I claim:

1. An improved tape reel comprising a hub having a tape-receiving surface, side members carried by said hub, a depression in said tape-receiving surface extending from one side of the tape-receiving surface and only part way across the transverse width of the tape-receiving surface, means rotatably mounted on one of said side members and with respect to said hub for maintaining said tape against said hub, said maintaining means including a clamping portion complementary to said depression and aligned with and movable into registry with said depression, said clamping portion having an upper surface which is substantially flush with said tape-receiving surface of said hub when in registry with said depression, and means for urging said maintaining means including said clamping portion towards said hub so that tape is firmly trapped between said clamping portion and said hub and in said depression, said clamping portion extending only part way across said tape-receiving surface to obviate binding between the top of said clamping portion and said one of said side members during clamping operation.

2. An improved tape reel comprising a hub having a tape-receiving surface, spaced flanges carried by said hub, a depression in said tape-receiving surface extending from one side of the tape-receiving surface and only part way across the transverse width of the tape-receiving surface, means rotatably mounted on said reel and with respect to said hub for maintaining said tape in place on said hub, said maintaining means including a clamping portion which is complementary in shape to said depression and is aligned with said depression, said clamping portion including an upper surface which is substantially flush with said tape-receiving surface when positioned within said depression, said maintaining means also including a lift portion for effecting rotation of said clamping portion away from said depression, said lift portion being substantially flush with the outer surface of one of said flanges when said clamping portion has its upper surface substantially flush with said tape-receiving surface, said clamping portion extending only part way across said tape-receiving surface to obviate binding of the tape between the top of the clamping portion and one of said flanges during clamping operation.

References Cited by the Examiner

UNITED STATES PATENTS

| | | | |
|---|---|---|---|
| 1,089,082 | 3/1914 | Rees | 242—74.2 |
| 1,296,392 | 3/1919 | Hoffman | 242—74.1 |
| 2,486,473 | 11/1949 | Hart | 242—74.2 |
| 2,859,920 | 11/1958 | Flahan | 242—74.1 |
| 2,915,256 | 12/1959 | Bruhn | 242—74.2 |
| 3,159,358 | 12/1964 | Joiner | 242—74.1 |

MERVIN STEIN, *Primary Examiner.*